Patented Jan. 27, 1953

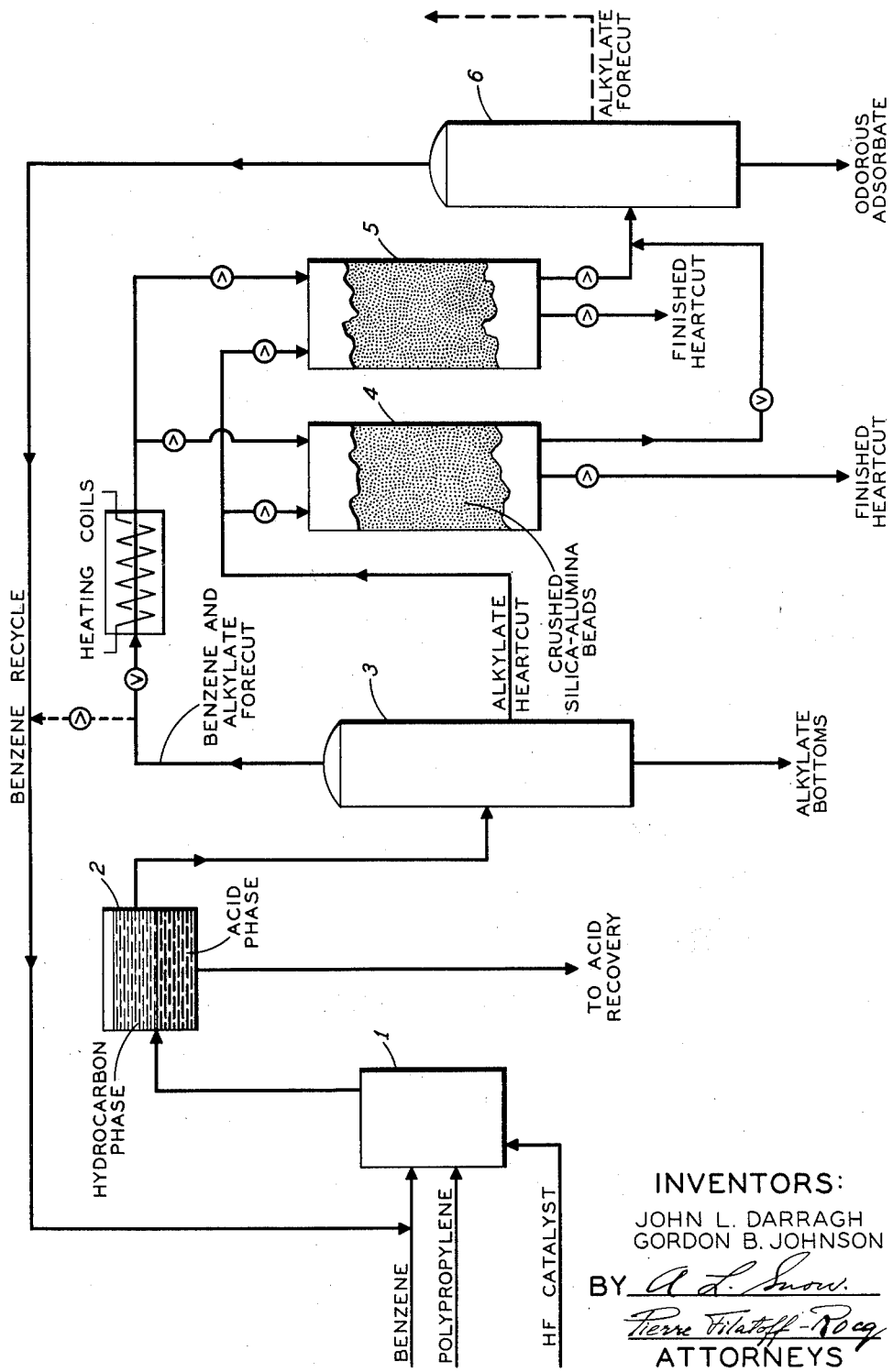

2,626,967

UNITED STATES PATENT OFFICE 2,626,967

DEODORIZATION OF MONOARYL SUBSTITUTED ALKANES

John L. Darragh, Alamo, and Gordon B. Johnson, Berkeley, Calif., assignors to California Research Corporation, San Francisco, Calif., a corporation of Delaware Application February 6, 1951, Serial No. 209,632

10 Claims. (Cl. 260—671)

This invention relates to an improvement in the preparation of monoaryl-substituted alkanes, and more particularly to the removal of undesirable odorous constituents from monoaryl-substituted alkanes.

High molecular weight monoaryl-substituted alkanes produced by the alkylation or condensation of mononuclear hydrocarbons of the benzene series with olefins, which may be either straight-chain or branched-chain olefins and may contain from 8 to 18 carbon atoms in the molecule, represent industrially important organic hydrocarbon liquids. They are suitable for a great number of useful applications: as intermediates for the manufacture of sulfonated monoaryl alkane detergents, wetting agents and other valuable surface-active compounds; as extraction oils; as scrubbing oils, i. e. oils used, for instance, to scrub out and recover valuable organic compounds from gases containing the same; and also as intermediates for the preparation of a large number of chemicals and pharmaceuticals, e. g., quaternary ammonium organic salts.

The above-mentioned liquid high molecular weight monoaryl-substituted alkanes can be advantageously synthesized by condensing an olefin or an olefin polymer of at least 8 carbon atoms in the molecule with a mononuclear hydrocarbon of the benzene series in the presence of an alkylation catalyst. As a general rule the application of this type of catalyst, e. g., sulfuric acid, is accompanied by considerable isomerization and fragmentation of the olefin molecules in the course of alkylation. Hydrofluoric acid has been found an efficacious catalyst for the preparation of high molecular weight monoaryl-substituted alkanes, its application effecting a substantial reduction of the aforementioned tendency toward fragmentation and isomerization. In fact, when a mononuclear hydrocarbon of the benzene series is condensed or alkylated with an olefin or an olefin polymer containing from 8 to as many as 18 carbon atoms in the molecule in the presence of hydrofluoric acid as a catalyst at temperatures ranging from 0 to 150° F., liquid monoaryl-substituted alkanes are formed which are characterized by their stability to isomerization or fragmentation of the alkane portion of their molecules. As a consequence, these monoaryl-substituted alkanes containing from 8 to 18 carbon atoms in their alkane portion, and particularly those among them containing from 12 to 15 carbon atoms in the alkane portion, represent excellent intermediates for the synthesis of a number of valuable derivatives possessing new and useful properties, without being subjected to deleterious decomposition or isomerization in the course of such synthesis.

The condensation of olefins and mononuclear hydrocarbons of the benzene series being as a rule effected in the presence of an excess of these latter, the resulting product mixture contains unreacted aromatic hydrocarbons, usually benzene. In addition, it contains some lower molecular weight monoaryl alkanes (alkylate forecut) which owe their formation to the aforementioned fragmentation and isomerization, a large fraction of monoaryl alkanes boiling from about 475° F. to about 650° F. (alkylate heart cut) and finally some heavier, higher-boiling bottoms predominantly consisting of polyalkyl benzenes. This condensation (alkylation) reaction mixture is fractionally distilled first to remove the unreacted excess of aromatic hydrocarbon, and then to separate as overhead stock the lighter monoaryl alkanes boiling below about 475° F. After these separations, the desired heart cut of monoaryl alkanes can be readily separated from the bottoms. However, all liquid monoaryl-substituted alkanes after separation by distillation, including those secured through the application of hydrofluoric acid as an alkylation catalyst, are found to possess a pronounced disagreeable odor. This odor is foreign to corresponding pure monoaryl-substituted alkanes produced by special laboratory techniques, e. g., by acetylation. The presence of this odor renders the handling of monoaryl-substituted alkanes a disagreeable task. Furthermore, this odor tends to contaminate the materials treated with or mixed with monoaryl-substituted alkanes, e. g., in the processes of extraction, and impairs the quality of the materials so treated. In addition, this odor tends to pass over to the derivatives synthesized from monoaryl-substituted alkanes, interfering with reducing the salability of these derivatives.

The conditions of fractional distillation necessary for the separation of the light alkylate forecut and the heart cut alkylate boiling from about 475° F. to about 650° F. are quite drastic and require the application of a vacuum. It is during this fractional distillation of the monoaryl alkane product mixture that the objectionable odor is first observed. While the bottoms fraction separated during the distillation of a monoaryl alkane product mixture and boiling above about 600° F. does not have this specific disagreeable odor, both the forecut and the heart cut fractions do.

Apparently, the drastic conditions of distillation under vacuum employed for the separation of the alkylate fore-cut and particularly for the separation of the alkylate heart cut at temperatures from about 500° F. to about 600° F. are responsible for the formation of these odorous compounds.

By resorting to special distillation techniques to separate 5% cuts from samples of monoaryl-substituted alkanes of less than 400 ml. in size in the laboratory, in particular, by employing a spinning band column at a pressure from 0.1 to 0.3 mm., it was determined that the odorous substances were present only in the first 5% by volume distillation fraction of the heart cut, in other words, in the fraction boiling below about 530° F., and amounted to from about 0.1 to about 1.0% by weight thereof.

The true nature of compounds imparting this disagreeable odor to the fractionally distilled heart cut of monoaryl-substituted alkane, produced by alkylating a mononuclear hydrocarbon of the benzene series with olefins containing from 8 to 18 carbon atoms, is not known; however, their presence in amounts from about 0.1 to about 1.0% by weight of the heart cut is obnoxious.

It has now been found that the disagreeable odor of fractionally distilled heart cuts of monoaryl-substituted alkanes produced by condensing or alkylating mononuclear hydrocarbons of the benzene series with $C_8$ to $C_{18}$ olefins can be substantially reduced, if not completely eliminated, by contacting these alkylate heart cuts with a solid silica-alumina adsorbent characterized by a weight ratio of silica to alumina at least greater than one. The treatment of monoaryl-substituted alkane heart cuts involves contacting them with the silica-alumina adsorbent in a vessel or tower at a temperature which may range from room temperature to about 200° F. The odorous constituents are selectively adsorbed by the silica-alumina adsorbent and may be eluted from the adsorbent by a highly polar organic solvent, such as methanol, or any suitable hot organic liquid-phase solvent, e. g., chloroform, various paraffinic hydrocarbons, aromatic hydrocarbons, and alkyl aromatic hydrocarbons. The liquid-phase solvents must be at a temperature from about 350° to about 450° F. in order to effect the separation and removal of odorous constituents from the silica-alumina adsorbent. To maintain the solvent in liquid phase, pressure will be applied if necessary.

While the silica-alumina adsorbents having a silica-to-alumina weight ratio greater than one are preferred, other heterogeneous adsorbents, which possess a surface acidity of the order of a pH of 6.0, and preferably of the order of a pH of 4.0 and less, and which are represented by such adsorbent materials as silica-magnesia, silica-zirconia, silica-beryllia, titania-alumina, silica-titania-alumina, and the like, may be successfully employed for the selective adsorption of odorous constituents from monoaryl substituted alkane heart cut fractions in accordance with our invention.

In all cases the surface acidity of such heterogeneous adsorbents and their consequent suitability for the adsorption of odorous constituents can be readily ascertained by the method described by C. Walling in the article entitled "The Acid Strength of Surfaces," published in the Journal of American Chemical Society, vol. 72, pages 1164 to 1168, (March 1950).

The silica-alumina adsorbents employed in the process of this invention appear to be unique in their ability of effecting an efficient separation of odorous constituents from monoaryl substituted alkanes, considering the fact that such adsorbents as charcoal, alumina, silica gel, and even silica-alumina adsorbents having a silica-alumina weight ratio of less than one, have been found to be incapable of effecting a satisfactory separation.

Among the silica-alumina adsorbents characterized by a silica-to-alumina weight ratio at least greater than one, in other words, containing an excess of silica, the naturally-occurring montmorillonite- and kaolin-type clays have been found effective in reducing the content in odorous constituents of the monoaryl-substituted alkanes by 50 to 80% and even more. The adsorption treatment of monoaryl-substituted alkanes with these clays comprises contacting the monoaryl-substituted alkane with the clay in a stainless steel vessel equipped with stirrers for a period of time ranging from about ½ to 1½ hours at a temperature ranging from about room temperature to about 200° F., and preferably from about 150° F. to 200° F. The amount of clay required for deodorization can be varied from 0.25 lb. to 1 lb. per one gallon of monoaryl-substituted alkane, depending on the temperature and the duration of the contact. The higher the temperature, the less clay will be required to effect a comparable reduction of undesirable odor. Likewise, the longer the time of contact, the more thorough will be the extent of deodorization.

When the clay adsorbent becomes incapable of retaining the odorous constituents as a result of its prolonged use for deodorizing monoaryl-substituted alkanes in accordance with our invention, it may be regenerated by settling, filtering and burning out the adsorbed odorous components, or it may be withdrawn from the operation and replaced by a fresh batch of clay adsorbent.

Kaolin clays, also known as china clays, are more effective than montmorillonite clays. Whereas the adsorption treatment with a montmorillonite clay, known in the trade under the name of Filtrol, which is a clay recovered by The Filtrol Company of Los Angeles, California, from the deposits near Chito, Arizona, and which has on the average a silica-to-alumina weight ratio of about 3.5 to about 4.5, reduces the odor of monoaryl-substituted alkanes by as much as 50%; kaolin clays having a silica-to-alumina weight ratio in the range from about 1.5 to about 3.0 are capable not only of reducing the odor of monoaryl-substituted alkanes by 75–80%, but can often eliminate this odor practically completely.

The application of clays for the deodorization of monoaryl-substituted alkanes in accordance with our invention is illustrated by the data in Table I which contains the results of several test runs carried out with a representative monoaryl-substituted alkane mixture, employing varying amounts of kaolin clay, temperatures and contact times.

The monaryl-substituted alkanes employed in these runs were prepared by alkylating an excess of benzene with a mixture of polymers of propylene, boiling within the range from about 340° F. to about 520° F. and consisting of approximately 60% of propylene tetramers and 40% of propylene pentamers. The alkylation was carried out in the presence of hydrofluoric acid as a catalyst in accordance with the procedure described in U. S. Patent No. 2,477,382 to Allen H. Lewis. The heart cut fraction of monophenyl-substituted alkane, obtained by this alkylation and subsequent fractional distillation to separate said heart cut from unreacted benzene, light alkylate forecut and bottoms, had the following characteristics:

| | |
|---|---:|
| A. P. I. gravity | 29.9 |
| Color, Saybolt | +23 |
| Aniline point | 54 |
| Bromine No | 0.16 |
| Viscosity Saybolt at 100° F | 47.9 SSU |

This heart cut fraction of monophenyl-substituted alkane boiled between 520° F. and 589° F., 50% going over at 554° F. (ASTM Distillation D-447).

Since no definitely-established standards exist in the art for rating the intensity of an odor, an arbitrary standard which would exclude as much as possible the likelihood of organoleptic errors had to be devised. Accordingly, several samples of the above-identified monophenyl-substituted alkane of bad and good odor were blended together to form standards of varying odor intensities and assigned numbers from 2 through 9 in accordance with the increase in odor intensity based on the average opinion of a panel of 14 persons. No. 1 was assigned to a sample of an odorless heart cut fraction of monophenyl-substituted alkane, produced by the previously mentioned HF alkylation and purified (deodorized) by distillation of a small batch thereof equal to less than 400 ml. in a spinning band column at a pressure from 0.1 to 0.03 mm.

It is noted from Table I that at higher temperatures of the order of 200° F., less clay is required per gallon of monophenyl-substituted alkane than at lower temperatures. Likewise, the longer the contact time, particularly at temperatures above 150° F., the more complete is the deodorization.

TABLE I

*Kaolin clay contact treatment for deodorizing monophenyl alkane*

(original odor=7)

| Run No. | Clay, Lbs./Gal. of Alkane | Temp., °F. | Contact in Hrs. | Odor after Treatment |
|---|---|---|---|---|
| 1 | 1 | 75 | 1 | 7 |
| 2 | 1 | 100 | 1 | 7 |
| 3 | 1 | 150 | 1 | 1 |
| 4 | 1 | 180 | 1 | 1 |
| 5 | 1 | 200 | 1 | 1 |
| 6 | 1 | 180 | ¾ | 1 |
| 7 | 1 | 180 | ½ | 4 |
| 8 | 0.5 | 100 | 1 | 7 |
| 9 | 0.5 | 180 | 1 | 5 |
| 10 | 0.5 | 200 | 1 | 1 |
| 11 | 0.25 | 200 | 1 | 1 |

The deodorization of monoaryl-substituted alkane by adsorption with silica-alumina adsorbent materials can be carried out effectively and more completely by employing as the adsorbent a synthetic silica-alumina material in which the weight ratio of silica to alumina ranges from about 6.0 to about 10.0. A typical example of such a synthetic adsorbent is a silica-alumina material produced by coprecipitating alumina and silica in the form of pellets or beads in which the weight ratio of silica to alumina is about 9.5. This material is known in the art as an excellent catalyst for the cracking of petroleum oils by the so-called "Thermofor Catalytic Cracking Process." The preparation of such particulate or granular silica-alumina materials is described in the art, for instance, in U. S. Patent No. 2,449,664 to Marisic. We have found that by percolating a feed stream of a heart cut fraction of monoaryl-substituted alkane through a column packed with the afore-described particulate silica-alumina catalytic material, preferably crushed to a size of about 40 to 100 mesh, the objectionable odor of monoaryl-substituted alkane can be practically entirely eliminated.

When the adsorbent power of the silica-alumina material is diminished to a point where it can no longer effectively capture all of the odorous constituents, the percolation of monoaryl-substituted alkane heart cut is interrupted and a high polarity eluant such as methanol or ethanol, or an organic liquid-phase solvent heated to a temperature from about 350° to about 450° F. may be employed to separate and to flush the accumulated odorous constituents. Upon separation of the eluant or solvent, e. g., by evaporation, the odorous materials are recovered as an amber-colored liquid having the specific disagreeable odor of the original untreated monoaryl-substituted alkane heart cut.

Table II illustrates the results of deodorizing treatment of a representative sample of a monoaryl-substituted alkane produced by condensing an excess of benzene with a fraction of $C_{12}$ and $C_{15}$ polypropylene boiling in the range from about 340° F. to about 520° F. and by subsequently distilling off unreacted benzene and light alkylate forecut boiling below about 475° F. and separating, on further distillation, the desired monophenyl-substituted alkane heart cut from the predominantly polyalkylated aromatic bottoms.

Odorous components were adsorbed on a silica-alumina material having a silica to alumina weight ratio of 9.5, and having the form of coprecipitated silica-alumina beads, produced as described in the afore-mentioned Marisic patent and crushed to a size of 40 to 100 mesh, and subsequently removed from the exhausted silica-alumina adsorbent particles by selective elution with a suitable eluant or a hot liquid-phase solvent.

The phenyl-substituted alkane so treated had the following average characteristics:

| | |
|---|---:|
| A. P. I. gravity | 30.1 |
| Color, Saybolt | +24 |
| Aniline point | 54 |
| Bromine No | 0.3 |
| Viscosity, Saybolt at 100° F | 47.0 SSU |
| Sulfur | 0.01% |

The monophenyl-substituted alkane boiled between about 500–600° F., 50% going over at 550–555° F. (ASTM Distillation D-447).

The deodorization of the afore-described monophenyl-substituted alkane by percolation through crushed silica-alumina adsorbent ($SiO_2:Al_2O_3$ wt. ratio=9.5), shown in Table II, was carried out at a temperature from about 150 to about 160° F. Effective deodorization was obtained by feeding from 5 to 50 volumes of the monophenyl-substituted alkane per one volume of adsorbent, the ratio of 40 to 50 volumes of the heart cut per one volume of the adsorbent securing the most efficient and economic deodorization. When higher temperatures up to 200° F. were employed, the removal of odor from all samples was substantially complete and was rated by the test panel to be equal to one. The recoveries of odorless monophenyl-substituted alkane ranged from more than 95 to about 98% by volume. As will be shown later on, in commercial plant practice recoveries up to 99% by volume can be attained.

TABLE II

*Deodorization by percolation through silica-alumina adsorbent beads*

| Sample No | 1 | 2 | 3 |
|---|---|---|---|
| Initial Odor | 2 | 7 | 7 |
| Odor after percolation through silica-alumina adsorbent | 1 | 2 | 2 |

One of the reasons for our preference for the coprecipitated solid particulate silica-alumina adsorbent material lies in the ease of regenerating exhausted adsorbent particles or beads as compared with the regeneration of clay and in the resulting economy of materials. To regenerate the exhausted particles of silica-alumina adsorbent packed in the adsorption column, these particles or beads can be flushed with any suitable hot liquid-phase solvent, e. g., methanol, ethanol, chloroform, carbon tetrachloride, a paraffinic hydrocarbon, or an aromatic hydrocarbon such as benzene.

In a continuous plant operation we prefer to employ for the regeneration of exhausted adsorbent material a portion of the light overhead fraction from the distillation of the alkylate produced by condensing an olefin such as polypropylene and an aromatic hydrocarbon such as benzene. This preferred mode of operation is highly advantageous, for it dispenses with the necessity of employing an eluant or solvent material extraneous to the alkylation process and, in one mode of operation, requires no additional fractionation of the adsorbate to recuperate the eluant or solvent.

The details of this preferred mode of regeneration may be readily understood from the flow diagram in the attached drawing, in which benzene and olefin are shown to enter an alkylator 1, whence the oil phase of the alkylation reaction mixture after settling and separation from the acid phase in settler 2 is led to a fractionation column 3. The lighter monophenyl-substituted alkanes and excess of unreacted benzene pass overhead and are recycled to alkylator 1, while a portion of this overhead fraction is fed at a temperature from 350° F. to 450° F. to one of two or several adsorbers 4, which has been cut off-stream for the purpose of regenerating the silica-alumina material therein. Heating coils are provided to maintain the temperature of 350-450° F. in this portion of the overhead fraction. The heart cut alkane leaves the fractionation column 3 and enters a second adsorber 5, while the bottoms are taken out from fractionation column 3 to be processed in any desired manner. The finished odorless monophenyl-substituted alkane is recovered by percolation through silica-alumina crushed beads at the bottom of adsorber 5. Meanwhile, the light monophenyl-substituted alkane fraction introduced into adsorber 4, containing the spent adsorbent, separates the odorous constituents from the surface of silica-alumina particles, and carries these odorous constituents to a fractionation column 6, where the benzene is taken out overhead and may be recycled to alkylator 1, while the light monophenyl-substituted alkane may be either separated from the odorous components by fractional distillation to be used in any desired manner and taken out as the middle fraction, or may be rejected without separating it from the accumulated odorous constituents. Any resident non-odorous monophenyl-substituted alkane material retained by the spent silica-alumina particles in adsorber 4 will be swept out by the first portion of the light monophenyl-substituted alkane effluent and may be recovered therefrom by a suitable fractionation technique, thus bringing the recovery of odorless monophenyl-substituted alkane to a figure approaching 99% by volume.

In an alternative method of regenerating the adsorbent, the overhead fraction of lighter monophenyl-substituted alkane and excess of unreacted benzene on leaving fractionation column 3 is subjected to further fractionation in another column (not shown in the drawing) to separate the benzene and a portion of the light monophenyl-substituted alkane and to recycle them to the alkylator. The remaining portion of light monophenyl-substituted alkane is then employed to flush the odorous constituents in the adsorption column containing the spent adsorbent. In such a case, it is unnecessary to effect the separation of benzene and of the light monophenyl-substituted alkane from the odorous constituents in a special fractionation column, described hereinabove as column 6, and the solvent containing the odorous contaminants may be dropped out directly from the adsorber.

In describing our invention, we have assumed that the monoaryl-substituted alkanes to be treated with silica-alumina adsorbent materials for the purpose of removing therefrom objectionable odorous compounds formed in the fractionation of crude alkylates, produced by condensing an excess of a mononuclear hydrocarbon of the benzene series with an olefin containing from 8 to 18 carbon atoms, are free from other unusual odorous materials which may occasionally be present in such monoaryl-substituted alkane stocks as a result of an insufficient caustic treatment to remove mercaptans, or owing to an initial contamination of benzene or olefin feeds. These particular odors, if they exist, must be removed from monoaryl-substituted alkanes by suitable purification methods other than the method of the present invention.

It is to be understood that the above description is to be broadly interpreted and that the illustrative examples contained therein are not to be taken as limiting the scope of the invention claimed in the attached claims.

We claim:

1. In the process for preparing monoaryl-substituted alkanes by alkylating a mononuclear hydrocarbon of the benzene series with an olefin containing from 8 to 18 carbon atoms in the molecule in the presence of an alkylation catalyst and by fractionally distilling the alkylate to recover therefrom a heart cut fraction boiling above about 475° F. and below about 650° F., the step of removing odorous constituents formed in the course of said distillation by contacting the distilled heart-cut fraction with a silica-alumina adsorbent material having a silica to alumina weight ratio from above 1.0 to about 10.0.

2. In the process for preparing monoaryl-substituted alkanes by alkylating a mononuclear hydrocarbon of the benzene series with an olefin containing from 8 to 18 carbon atoms in the molecule in the presence of an alkylation catalyst and by fractionally distilling the alkylate to recover therefrom a heart-cut fraction boiling from above about 475° F. and below about 650° F., the improvement which comprises contacting said heart cut with a silica-alumina adsorbent having a silica to alumina weight ratio from above 1.0 to about 10.0 to remove a minor selectively adsorbed odorous fraction, the volume of said fraction not exceeding 1% of the volume of said heart cut, the odorous constituents of said fraction having been formed in the course of said fractional distillation of said alkylate.

3. In the process for preparing monoaryl-substituted alkanes by alkylating a mononuclear hydrocarbon of the benzene series with an olefin containing from 8 to 18 carbon atoms in the molecule in the presence of an alkylation catalyst, and fractionally distilling the alkylate in order to recover a heart cut fraction thereof boiling above about 475° F. and below about 650° F., the step of deodorizing said heart cut fraction by removing therefrom odorous constituents formed during said fractional distillation of said alkylate by an adsorption treatment at a temperature from about room temperature to about 200° F. with a silica-alumina adsorbent material having a silica to alumina weight ratio from about 1.0 to about 10.0.

4. In the process for preparing monoaryl-substituted alkanes by alkylating a mononuclear hydrocarbon of the benzene series with an olefin containing from 8 to 18 carbon atoms in the molecule in the presence of an alkylation catalyst, and fractionally distilling the alkylate to recover a heart cut fraction thereof boiling above about 475° F. and below about 650° F., the step of deodorizing said heart cut fraction by removing therefrom odorous constituents formed during said fractional distillation of said alkylate by an adsorption treatment at a temperature from about room temperature to about 200° F. with a silica-alumina adsorbent material having a silica to alumina weight ratio from about 1.0 to about 10.0, and selected from the group consisting of kaolin clay, montmorillonite clay and synthetic coprecipitated silica-alumina.

5. In the process for preparing monoaryl-substituted alkanes by alkylating a mononuclear hydrocarbon of the benzene series with an olefin containing from 8 to 18 carbon atoms in the molecule in the presence of an alkylation catalyst, and fractionally distilling the alkylate in order to recover a heart cut fraction thereof boiling above about 475° F. and below about 650° F., the step of deodorizing said heart cut fraction by removing therefrom odorous constituents formed during said fractional distillation of said alkylate by contact with adsorbent kaolin clay having a silica to alumina weight ratio from about 1.5 to about 3.0 at a temperature from about room temperature to about 200° F.

6. In the process for preparing monoaryl-substituted alkanes by alkylating a mononuclear hydrocarbon of the benzene series with an olefin containing from 8 to 18 carbon atoms in the molecule in the presence of an alkylation catalyst, and fractionally distilling the alkylate in order to recover a heart cut fraction thereof boiling above about 475° F. and below about 650° F., the step of deodorizing said heart cut fraction by removing therefrom odorous constituents formed during said fractional distillation of said alkylate by contact with adsorbent kaolin clay having a silica to alumina weight ratio from about 1.5 to about 3.0, at a temperature from about room temperature to about 200° F., in a ratio of about 0.25 pound to about 1 pound of kaolin clay per 1 gallon of said heart cut fraction.

7. In the process for preparing monoaryl-substituted alkanes by alkylating a mononuclear hydrocarbon of the benzene series with an olefin containing from 8 to 18 carbon atoms in the molecule in the presence of an alkylation catalyst, and fractionally distilling the alkylate in order to recover a heart cut fraction thereof boiling above about 475° F. and below about 650° F., the step of deodorizing said heart cut fraction by removing therefrom odorous constituents formed during said fractional distillation of said alkylate by percolation at a temperature from about room temperature to about 200° F. through a synthetic coprecipitated particulate silica-alumina adsorbent material having a silica-to-alumina weight ratio from about 6.0 to about 10.0.

8. In the process for preparing monoaryl-substituted alkanes by alkylating a mononuclear hydrocarbon of the benzene series with an olefin containing from 8 to 18 carbon atoms in the molecule in the presence of an alkylation catalyst, and fractionally distilling the alkylate in order to recover a heart cut fraction thereof boiling above about 475° F. and below about 650° F., the step of deodorizing said heart cut fraction by removing therefrom odorous constituents formed during said fractional distillation of said alkylate by percolation at a temperature from about room temperature to about 200° F. through a synthetic particulate coprecipitated silica-alumina adsorbent material having a silica-to-alumina weight ratio from about 6.0 to about 10.0, and in a ratio from about 5 to about 50 volumes of said heart cut fraction to 1 volume of said silica-alumina adsorbent.

9. In the process for preparing monoaryl-substituted alkanes by alkylating a mononuclear hydrocarbon of the benzene series with an olefin containing from 8 to 18 carbon atoms in the molecule in the presence of an alkylation catalyst, and by fractionally distilling the alkylate to recover therefrom a heart cut fraction boiling above about 475° F. and below about 650° F., the step of removing odorous constitutents formed during said fractional distillation of said alkylate from said heart cut fraction by contacting with a heterogeneous adsorbent material which has a surface acidity of the order of a pH of 6.0 and less.

10. The improvement in the preparation of mono-aryl substituted alkanes as defined in claim 9, wherein said heterogeneous adsorbent material has a surface acidity of the order of a pH of 4.0 and less.

JOHN L. DARRAGH.
GORDON B. JOHNSON.

REFERENCES CITED

The following references are of record in the file of this patent:

UNITED STATES PATENTS

| Number | Name | Date |
| --- | --- | --- |
| 2,398,101 | Lipkin | Apr. 9, 1946 |
| 2,413,161 | Zerner et al. | Dec. 24, 1946 |
| 2,456,119 | Friedman et al. | Dec. 14, 1948 |
| 2,500,755 | Jones | Mar. 14, 1950 |